(12) United States Patent  
Ohta (10) Patent No.: US 6,823,691 B2
(45) Date of Patent: Nov. 30, 2004

(54) VAPOR COMPRESSION REFRIGERANT CYCLE

(75) Inventor: Hiromi Ohta, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/436,009

(22) Filed: May 12, 2003

(65) Prior Publication Data

US 2003/0209032 A1 Nov. 13, 2003

(30) Foreign Application Priority Data

May 13, 2002 (JP) ........................................ 2002-136955

(51) Int. Cl.⁷ ................................................ F25B 1/06
(52) U.S. Cl. ............................ 62/500; 62/191; 62/490
(58) Field of Search ............................... 62/239, 228.3, 62/191, 490, 500

(56) References Cited

U.S. PATENT DOCUMENTS 6,105,386 A * 8/2000 Kuroda et al. ................ 62/513
6,343,486 B1 * 2/2002 Mizukami .................... 62/509

* cited by examiner

Primary Examiner—Melvin Jones
(74) Attorney, Agent, or Firm—Harness, Dickey & Pierce, PLC (57) ABSTRACT

In a vapor compression refrigerant cycle using refrigerant having a critical temperature equal to or less than sixty degrees Celsius, when refrigerant temperature detected by a sensor as a parameter of a low-pressure side refrigerant pressure is higher than a saturation temperature corresponding to a predetermined pressure that is equal to or less than a critical pressure, a volume of air passing through an evaporator is controlled smaller than a predetermined volume by controlling operation of a blower unit. Because heat exchange rate (heat absorbing rate) in the evaporator is controlled, the pressure of the low-pressure side refrigerant is maintained below the critical pressure. Alternatively, the heat exchange rate is controlled by reducing a flow rate of the refrigerant in the evaporator.

14 Claims, 9 Drawing Sheets

VAPOR COMPRESSION REFRIGERANT CYCLE

CROSS REFERENCE TO RELATED APPLICATION

This application is based on Japanese Patent Application No. 2002-136955 filed on May 13, 2002, the disclosure of which is incorporated herein by reference.

FIELD OF THE INVENTION

The present invention relates to a vapor compression refrigerant cycle using refrigerant having a critical temperature equal to or less than sixty degrees Celsius, such as carbon dioxide, and suitably used for a vehicular air conditioner.

BACKGROUND OF THE INVENTION

In a vapor compression refrigerant cycle, as is well known, high-pressure refrigerant compressed in a compressor is cooled in a high-pressure side heat exchanger and low-pressure refrigerant in a low-pressure side heat exchanger is evaporated, so that heat from low-temperature refrigerant is transferred to high-temperature refrigerant.

For example, if a vehicle has been left under a burning sun for a long time in summer, temperature in a passenger compartment increases more than sixty degrees Celsius. In this case, therefore, a vehicular air conditioning unit requires capacity to quickly cool the inside air to approximately twenty-five degrees Celsius.

During such a quick cooling operation generating a large heat load, pressure of refrigerant in a low-pressure side heat exchanger, that is, in an evaporator, increases. In a case that refrigerant having a critical temperature that is higher enough than a temperature of air to be cooled, such as flon (R134a), is used, the temperature of the low-pressure side refrigerant falls less than the critical temperature even if the heat load is large. Therefore, because the low-pressure side refrigerant is in a gas and liquid phase state, air to be blown into the passenger compartment can be cooled by evaporating the refrigerant. Here, R134a has the critical temperature of approximately one hundred degrees Celsius.

On the other hand, in a case that refrigerant having the critical temperature that is lower than the temperature of the air to be cooled, such as carbon dioxide, is used, if the heat load increases, the temperature of the low-pressure side refrigerant is likely to increase equal to or higher than the critical temperature. As a result, the pressure of the low-pressure side refrigerant may increase equal to or higher than a critical pressure. Here, carbon dioxide has the critical temperature of approximately thirty-one degrees Celsius.

When the pressure of the refrigerant is higher than the critical pressure and the refrigerant is in a critical state, there is no physical difference between gas refrigerant and liquid refrigerant. Therefore, latent heat of vaporization of the refrigerant becomes substantially zero, so the air to be blown into the passenger compartment is cooled only by sensible heat. As a result, as compared with a case that the air is cooled by latent heat of vaporization by vaporizing the refrigerant, cooling capacity (refrigerating capacity) of the evaporator is largely decreased.

Also, in a vapor compression refrigerant cycle having a gas-liquid separator at an inlet side of the compressor for separating the refrigerant into gas refrigerant and liquid refrigerant, if pressure of the low-pressure side refrigerant increases equal to or higher than the critical pressure, pressure inside the gas-liquid separator also increases equal to or higher than the critical pressure. Therefore, it is difficult to separate the refrigerant into the gas refrigerant and the liquid refrigerant in the gas-liquid separator.

Further, in a vapor compression refrigerant cycle having an ejector (see JIS Z8126 No. 2. 1. 2. 3) as a pumping means for circulating the refrigerant to the evaporator, the refrigerant is supplied to the evaporator from the gas-liquid separator provided at the inlet side of the compressor. Therefore, if the refrigerant that has been heated in the evaporator flows in the gas-liquid separator, the refrigerant in the gas-liquid separator is heated and therefore the temperature of the refrigerant to be supplied to the evaporator increases. As a result, the cooling capacity (heat absorbing capacity) of the evaporator further decreases.

SUMMARY OF THE INVENTION

The present invention is made in view of the foregoing disadvantages and it is an object of the present invention to provide a vapor compression refrigerant cycle using refrigerant that has a critical temperature equal to or less than sixty degrees Celsius, which is capable of restricting a large drop in refrigerating capacity when the large refrigerating capacity is required.

According to the present invention, a vapor compression refrigerant cycle for transferring heat from low-temperature refrigerant to high-temperature refrigerant includes a compressor compressing refrigerant, a first heat exchanger for cooling high-pressure refrigerant compressed in the compressor, and a second heat exchanger for vaporizing low-pressure refrigerant after being decompressed. The refrigerant has a critical temperature equal to or lower than sixty degrees Celsius. In the cycle, a pressure of the refrigerant in the second heat exchanger is controlled equal to or lower than a predetermined pressure.

By controlling the pressure of the refrigerant in the second heat exchanger, a large drop in cooling capacity is restricted.

Preferably, the pressure of the refrigerant in the second heat exchanger is controlled by controlling pressure of the low-pressure refrigerant with a controlling device.

Preferably, the pressure of the refrigerant in the second heat exchanger is controlled by controlling a flow rate of air passing through the second heat exchanger. Because a heat exchange rate in the second heat exchanger is controlled, the pressure of the refrigerant in the second heat exchanger can be maintained below a critical pressure. Alternatively, the pressure of the refrigerant in the second heat exchanger is controlled by controlling a flow rate of the refrigerant to the second heat exchanger.

Preferably, the cycle further includes an ejector for decompressing the refrigerant discharged from the first heat exchanger, a gas-liquid separator for separating the refrigerant into gas refrigerant and liquid refrigerant, and a valve provided on a refrigerant passage connecting the ejector and the gas-liquid separator to bypass the second heat exchanger. The valve closes to block the refrigerant passage when the pressure of the refrigerant in the second heat exchanger is higher than the predetermined pressure that is equal to or lower than a critical pressure of the refrigerant.

Accordingly, the low temperature refrigerant after compressed is directly introduced into the second heat exchanger. Because the refrigerant to be supplied to the second heat exchanger is maintained at low temperature, the large drop in the cooling capacity is suppressed.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Embodiments of the present invention will be described hereinafter with reference to the drawings.

[First Embodiment]

Figure 1:
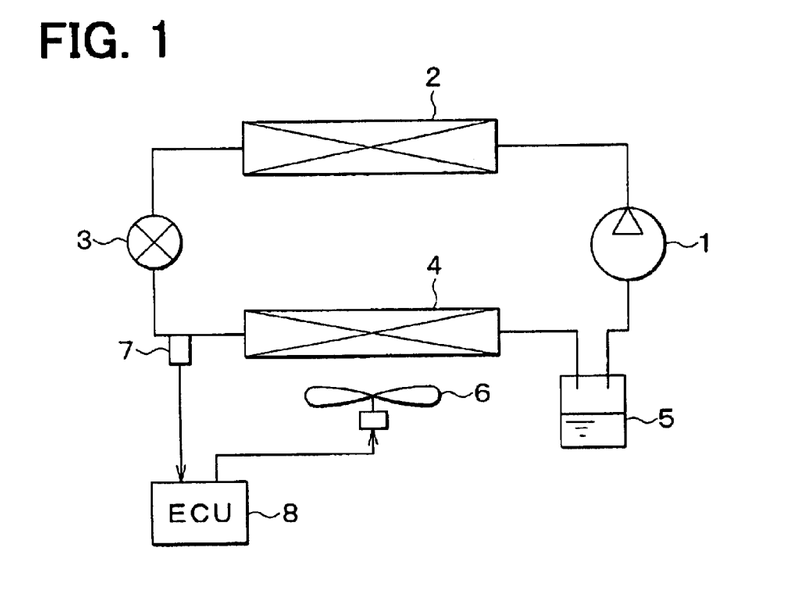
FIG. 1 is a schematic diagram of a vapor compression refrigerant cycle according to the first embodiment of the present invention.

A vapor compression refrigerant cycle shown in FIG. 1 is for example used for a vehicular air conditioning unit. A compressor 1 sucks and compresses refrigerant by receiving a driving force from an engine or a motor. A radiator 2 is a high-pressure side heat exchanger for radiating heat of the high-pressure refrigerant that has been compressed in the compressor 1 to air outside of a passenger compartment.

Here, carbon dioxide is used as the refrigerant. Pressure of the high-pressure side refrigerant, that is, a discharge pressure of the compressor 1 is increased to equal to or higher than a critical pressure of the refrigerant to ensure adequate refrigerating capacity.

An expansion valve 3 includes a pressure reducing means. The expansion valve 3 decompresses and expands the high-pressure refrigerant discharged from the radiator 2 in an isenthalpic form. An evaporator 4 is a low-pressure side heat exchanger. The evaporator 4 performs heat exchange between the low-pressure refrigerant decompressed in the expansion valve 3 and air to be blown into the passenger compartment. That is, the heat exchanger 4 absorbs heat from the air, thereby vaporizing and heating the refrigerant.

A gas-liquid separator 5 separates the refrigerant discharging from the evaporator 4 into gas refrigerant and liquid refrigerant and stores surplus refrigerant therein. Also, the gas-liquid separator 5 supplies the gas refrigerant to an inlet of the compressor 1. Further, in this embodiment, the gas-liquid separator 5 restricts the liquid refrigerant from being supplied to the compressor 1.

In the embodiment, the expansion valve 3 is to control pressure of the high-pressure side refrigerant based on temperature of the refrigerant at the high-pressure side, such as temperature at the outlet side of the radiator 2, such that the vapor compression refrigerant cycle has substantially a maximum coefficient of performance. Here, a mechanical expansion valve including a diaphragm that is operated in accordance with the temperature of the refrigerant is used as the expansion valve 3.

A blower unit 6 includes an air blowing means. The blower unit 6 blows air to the evaporator 4. A refrigerant temperature sensor 7 includes a temperature detecting means. The sensor 7 detects temperature of the low-pressure side refrigerant. An ECU (electronic control unit) 8 controls an air blow rate of the blower unit 6 based on such as the temperature detected by the sensor 7.

Next, characteristic operation and effects of the vapor compression refrigerant cycle of the embodiment will be described.

In the vapor compression refrigerant cycle, as is well known, the high-pressure refrigerant compressed in the compressor 1 is cooled in the radiator 2. Then, the refrigerant is decompressed in the expansion valve 3 so that the refrigerant is in a gas and liquid state. Thereafter, the liquid refrigerant is vaporized in the evaporator 4, thereby cooling the air to be blown into the passenger compartment.

At this time, when heat load increases such as in a quick cooling operation, the pressure of the low-pressure side refrigerant, that is, the refrigerant in the evaporator 4 increases, resulting in an increase in the temperature of the low-pressure side refrigerant. Further, when the temperature detected by the sensor 7 exceeds a saturation temperature corresponding to a predetermined pressure (for example, 6 MPa) that is equal to or lower than a critical pressure of the refrigerant, the ECU 8 stops the blower unit 6 or controls operation of the blower unit 6 at minimum air flow rate so that the air blow rate to the evaporator 4 becomes equal to or lower than a predetermined air flow rate.

In this way, heat exchange rate (heat absorbing rate) in the evaporator 4 can be controlled. Therefore, the pressure of the low-pressure side refrigerant is restricted from increasing equal to or higher than the critical pressure.

In the embodiment, although the sensor 7 is arranged at a refrigerant inlet of the evaporator 4, it can be arranged at another position.

[Second Embodiment]

Figure 2:
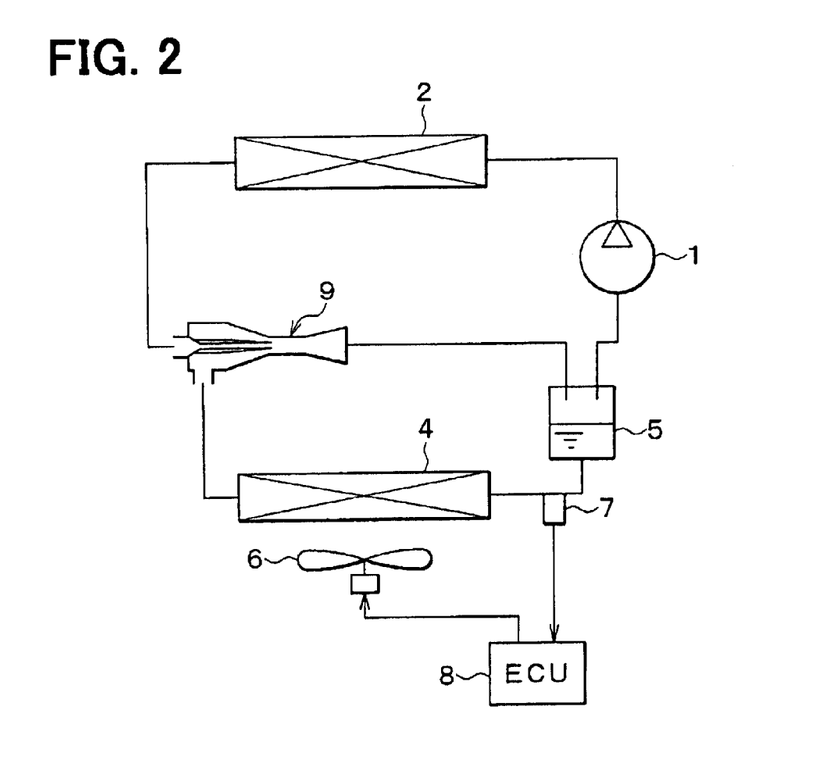
FIG. 2 is a schematic diagram of a vapor compression refrigerant cycle according to the second embodiment of the present invention.

As shown in FIG. 2, an ejector 9 is used in the vapor compression refrigerant cycle as a pumping means for circulating the refrigerant to the evaporator 4. Hereinafter, this vapor compression refrigerant cycle is referred to as an ejector cycle.

The ejector 9 generally includes a nozzle, a mixing portion, a diffuser and the like. The nozzle converts pressure energy (pressure head) of the high-pressure refrigerant to velocity energy (speed head), thereby decompressing and expanding the refrigerant. The mixing portion sucks the refrigerant from the evaporator 4 by a jet stream of the refrigerant jetted from the nozzle and mixes the refrigerant jetted from the nozzle and the refrigerant from the evaporator 4. The diffuser increases pressure of the refrigerant by converting the velocity energy of the refrigerant discharging from the mixing portion to the pressure energy.

In the ejector 9, the pressure of the refrigerant is increased in the mixing portion and the diffuser. Therefore, a pressure increase portion for increasing an inlet pressure of the compressor 1 is constructed of the mixing portion and the diffuser.

Similar to the first embodiment, when the temperature detected by the sensor 7 exceeds the predetermined temperature, the air blow rate to the evaporator 4 is controlled to equal to or less than the predetermined air blow rate by stopping or controlling the operation of the blower unit 6. Thus, the heat exchange rate (heat absorbing rate) of the evaporator 4 is restricted. Accordingly, the pressure of the low-pressure side refrigerant is maintained below the critical pressure.

[Third Embodiment]

Figure 3:
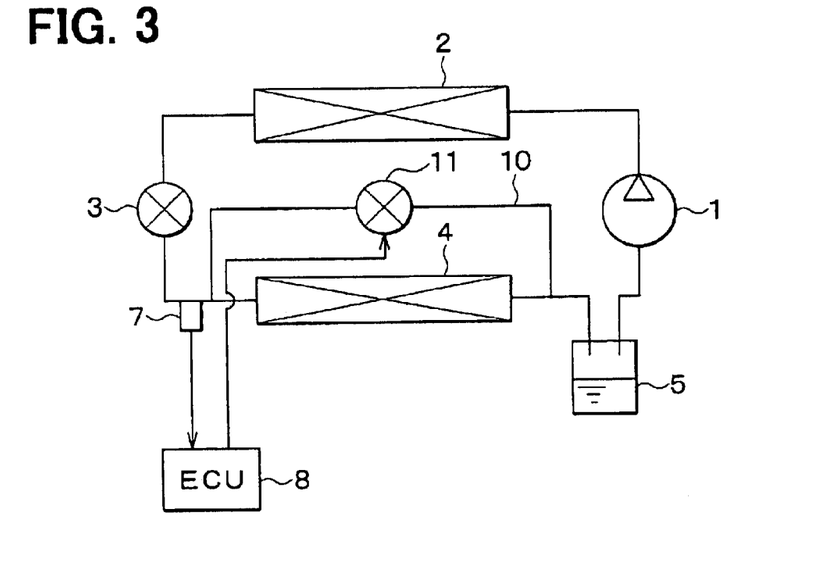
FIG. 3 is a schematic diagram of a vapor compression refrigerant cycle according to the third embodiment of the present invention.
Figure 4:
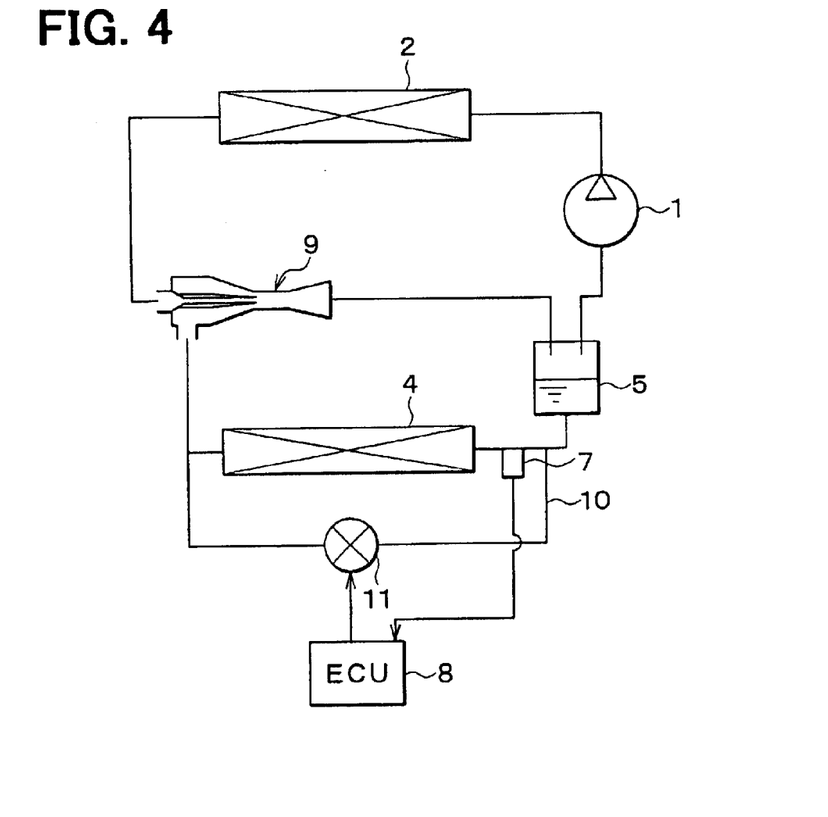
FIG. 4 is a schematic diagram of the vapor compression refrigerant cycle according to the third embodiment of the present invention.

In the third embodiment, a bypass passage 10 and a control valve 11 are provided in the cycle, as shown in FIGS. 3 and 4. The bypass passage is arranged to connect an inlet side and an outlet side of the evaporator 4, thereby allowing the refrigerant to bypass the evaporator 4. The control valve 11 controls a communication state in the bypass passage 10.

When the temperature detected by the sensor 7 exceeds the saturation temperature corresponding to the predetermined pressure (for example, 6 MPa) that is equal to or lower than the critical pressure, the control valve 11 is open to reduce the flow rate of the refrigerant to the evaporator 4 smaller than that before the pressure of the refrigerant in the evaporator 4 exceeds the predetermined pressure.

In this way, the heat exchange rate (heat absorbing rate) in the evaporator 4 is controlled. Therefore, the pressure of the low-pressure side refrigerant is maintained below the critical pressure.

FIG. 3 shows a case that the embodiment is applied to the vapor compression refrigerant cycle (hereinafter, referred to as an expansion valve cycle) including the expansion valve 3. FIG. 4 shows a case that the embodiment is applied to the ejector cycle.

[Fourth Embodiment]

Figure 5:
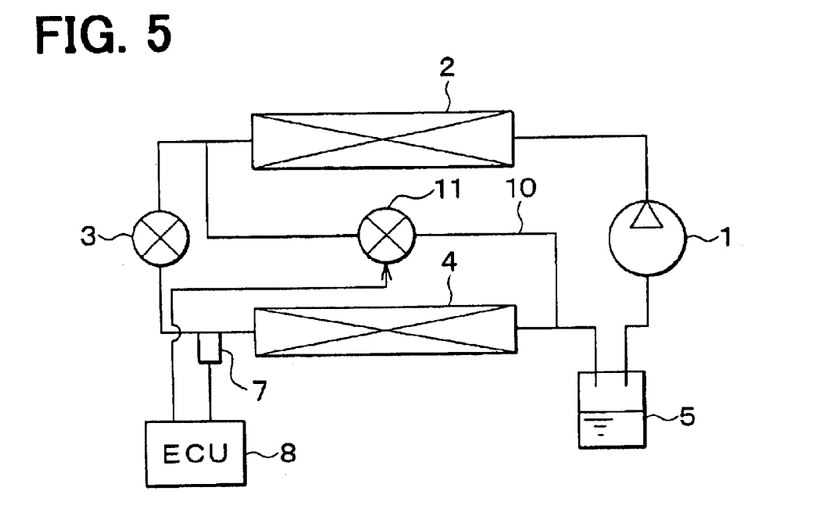
FIG. 5 is a schematic diagram of a vapor compression refrigerant cycle according to the fourth embodiment of the present invention.
Figure 6:
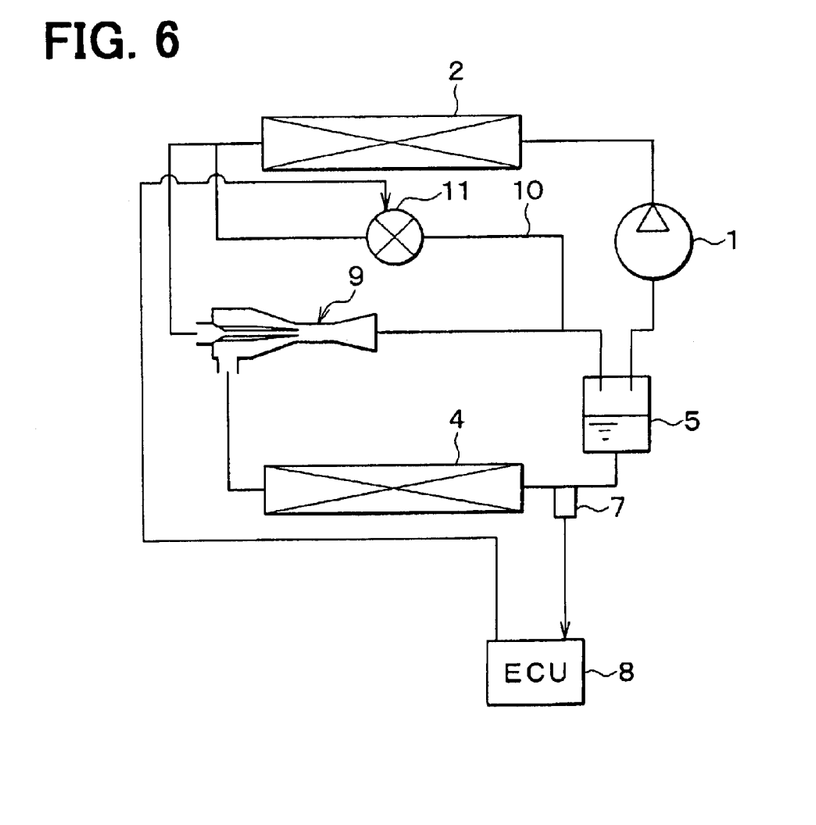
FIG. 6 is a schematic diagram of the vapor compression refrigerant cycle according to the fourth embodiment of the present invention.

In the fourth embodiment, the bypass passage 10 is arranged to communicate the refrigerant outlet of the radiator 2 and the refrigerant outlet of the evaporator 4, as shown in FIGS. 5 and 6.

In the expansion valve cycle shown in FIG. 5, the refrigerant before decompressed by the expansion valve 3 is introduced to the refrigerant outlet of the evaporator 4 through the bypass passage 10, thereby reducing the flow rate of the refrigerant flowing in the evaporator 4. Also, the refrigerant discharged from the radiator 2 is decompressed by the control valve 11, and thereafter, the refrigerant is introduced to the outlet side of the evaporator 4, that is, to the gas-liquid separator 5.

In the ejector cycle shown in FIG. 6, the refrigerant discharged from the radiator 2 is decompressed by the control valve 11. Then, the refrigerant is introduced to the outlet side of the ejector 9 that is on the refrigerant outlet side of the evaporator 4. That is, the refrigerant decompressed by the control valve 11 is introduced to the gas-liquid separator 5.

In the ejector cycle, the flow rate of the refrigerant flowing in the ejector 9 is reduced by opening the control valve 11, and thereby pumping capacity of the ejector 9 is reduced. Accordingly, the flow rate of the refrigerant flowing in the evaporator 4 is reduced.

[Fifth Embodiment]

Figure 7:
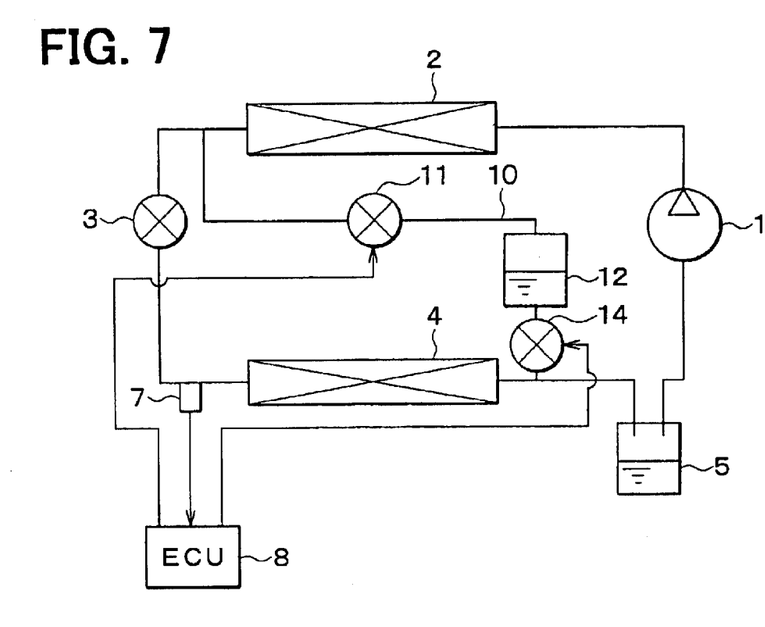
FIG. 7 is a schematic diagram of a vapor compression refrigerant cycle according to the fifth embodiment of the present invention.
Figure 8:
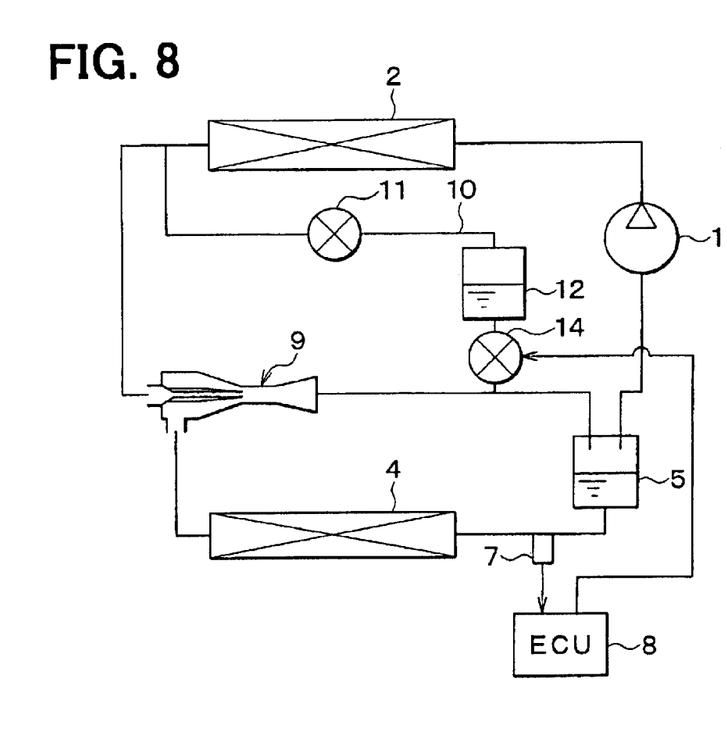
FIG. 8 is a schematic diagram of the vapor compression refrigerant cycle according to the fifth embodiment of the present invention.

The fifth embodiment is a modification of the fourth embodiment. As shown in FIGS. 7 and 8, a refrigerant tank 12 for storing the refrigerant is provided downstream from the control valve 11 in the bypass passage 10. Further, a second control valve 14 is provided on a refrigerant outlet side of the refrigerant tank 12 as a throttling means to throttle discharge of the refrigerant from the refrigerant tank 12. When the temperature detected by the sensor 7 exceeds the saturation temperature corresponding to the predetermined pressure (for example, 6 MPa) that is equal to or lower than the critical pressure, the control valve 11 is open and the second control valve 14 is closed.

With this, the refrigerant is stored in the refrigerant tank 12 and the liquid refrigerant in the gas-liquid separator 5 fully evaporates and becomes heating steam. Therefore, the flow rate of the refrigerant in the evaporator 4 reduces smaller than that before the pressure of the refrigerant in the evaporator 4 exceeds the predetermined pressure.

In this way, the heat exchange rate (heat absorbing rate) in the evaporator 4 is controlled. Therefore, the pressure of the low pressure side refrigerant is maintained below the critical pressure.

Here, FIG. 7 shows the expansion valve cycle to which the fifth embodiment is applied. FIG. 8 shows the ejector cycle to which the fifth embodiment is applied. In the fifth embodiment, because the refrigerant in the gas-liquid separator 5 becomes heating steam, it is preferable to arrange the sensor 7 at the refrigerant inlet side of the evaporator 4 where the refrigerant is in the gas and liquid state.

[Sixth Embodiment]

Figure 9:
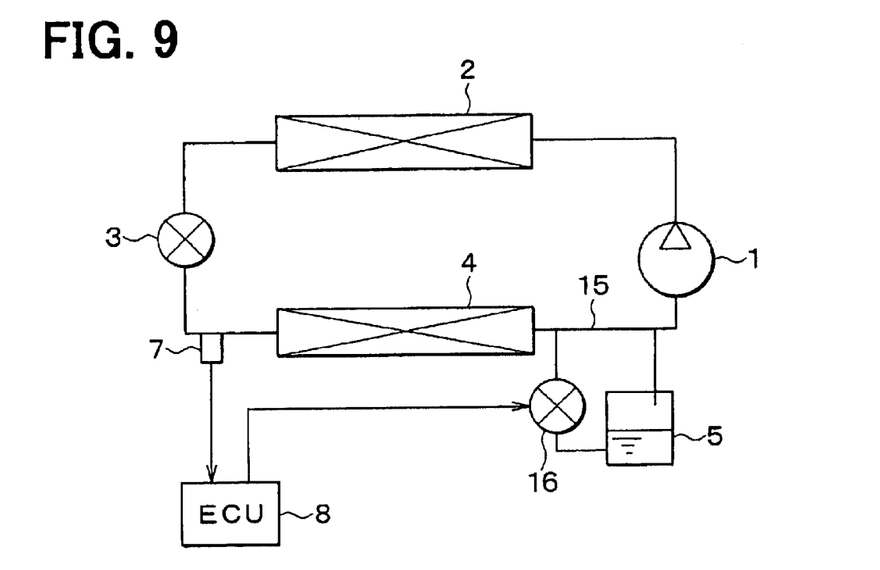
FIG. 9 is a schematic diagram of a vapor compression refrigerant cycle according to the sixth embodiment of the present invention.

As shown in FIG. 9, a bypass passage 15 and a control valve 16 are provided in the expansion valve cycle. The refrigerant discharged from the evaporator 4 is introduced to the inlet side of the compressor 1 while bypassing the gas-liquid separator 5. The control valve 16 opens and closes a refrigerant passage through which the refrigerant discharging from the evaporator 4 flows to the gas-liquid separator 5. When the temperature detected by the sensor 7 exceeds the saturation temperature corresponding to the predetermined pressure (for example, 6 MPa) that is equal to or lower than the critical pressure, the control calve 16 is closed.

With this, the amount of the refrigerant circulating in the cycle is restricted from increasing by further supply of the refrigerant from the gas-liquid separator 5. Therefore, the flow rate of the refrigerant flowing in the evaporator 4 reduces as compared with the flow rate before the refrigerant pressure exceeds the predetermined pressure.

In this way, because the heat exchange rate (heat absorbing rate) in the evaporator 4 is controlled, the pressure of the low pressure side refrigerant is maintained below the critical pressure.

[Seventh Embodiment]

Figure 10:
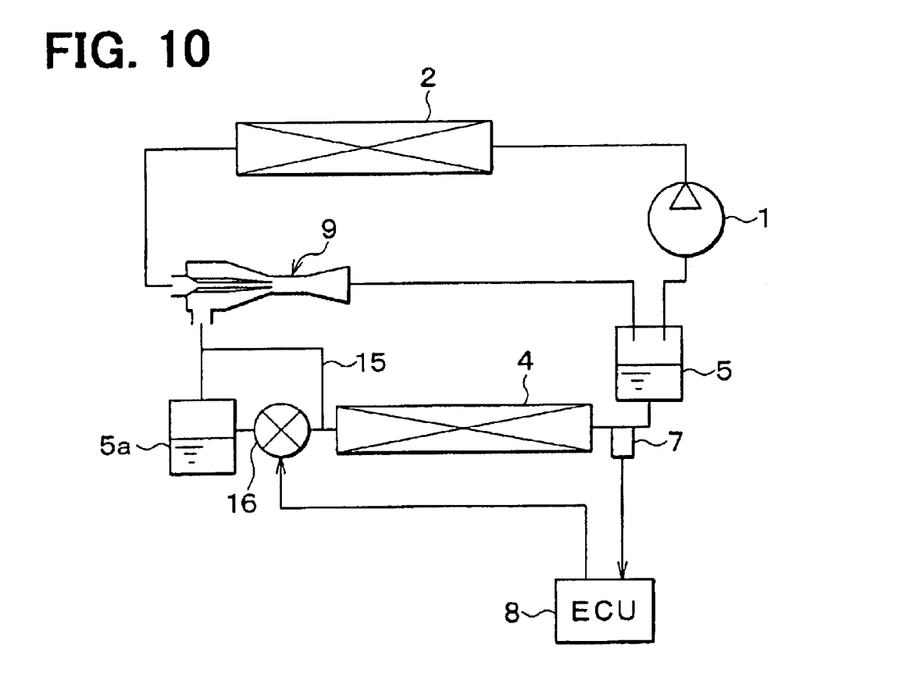
FIG. 10 is a schematic diagram of a vapor compression refrigerant cycle according to the seventh embodiment of the present invention.

In the seventh embodiment, the sixth embodiment is applied to the ejector cycle. Specifically, as shown in FIG. 10, a second gas-liquid separator 5a is provided in a refrigerant passage connecting the ejector 9 and the evaporator 4. Further, a bypass passage 15 and a control valve 16 are provided. The bypass passage 15 is provided to bypass the second gas-liquid separator 5a. The refrigerant discharged from the evaporator 4 is introduced to the inlet side of the compressor 1 through the bypass passage 15. The control valve 16 opens and closes a refrigerant passage through which the refrigerant discharging from the evaporator 4 flows to the second gas-liquid separator 5a. When the temperature detected by the sensor 7 exceeds the saturation temperature corresponding the predetermined pressure (for example, 6 MPa) that is equal to or lower than the critical pressure, the control valve 16 is closed.

With this, the amount of the refrigerant circulating in the cycle is restricted from increasing due to refrigerant supply from the second gas-liquid separator 5a. Therefore, the flow rate of the refrigerant in the evaporator 4 reduces smaller than that before the refrigerant pressure in the evaporator 4 exceeds the predetermined pressure.

In this way, because the heat exchange rate (heat absorbing rate) in the evaporator 4 is controlled, the pressure of the low-pressure side refrigerant is maintained below the critical pressure.

In the seventh embodiment, the surplus refrigerant in the cycle is mainly stored in the second gas-liquid separator 5a. The gas-liquid separator 5 works as a gas-liquid separating means that separates the refrigerant into the gas refrigerant and the liquid refrigerant and supplies the gas refrigerant and the liquid refrigerant to the compressor 1 and to the evaporator 4, respectively.

[Eighth Embodiment]

Figure 11:
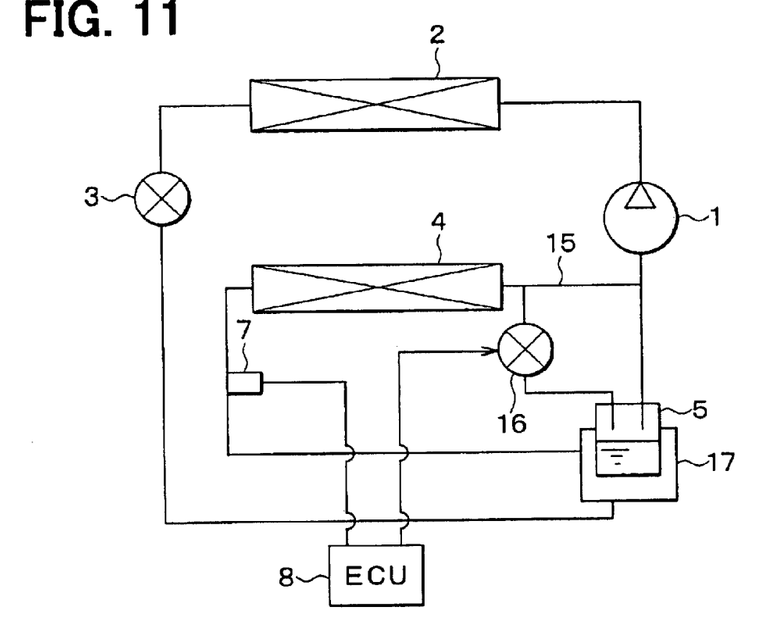
FIG. 11 is a schematic diagram of a vapor compression refrigerant cycle according to the eighth embodiment of the present invention.

The eighth embodiment is a modification of the sixth embodiment. Specifically, as shown in FIG. 11, a cooling device 17 is provided to cool the gas-liquid separator 5 by the low-pressure refrigerant the temperature of which is reduced by being decompressed in the expansion valve 3.

Because the temperature inside the gas-liquid separator 5 can be maintained at equal to or lower than the critical temperature by the cooling device 17, the pressure of the low pressure side refrigerant is maintained below the critical pressure.

[Ninth Embodiment]

Figure 12:
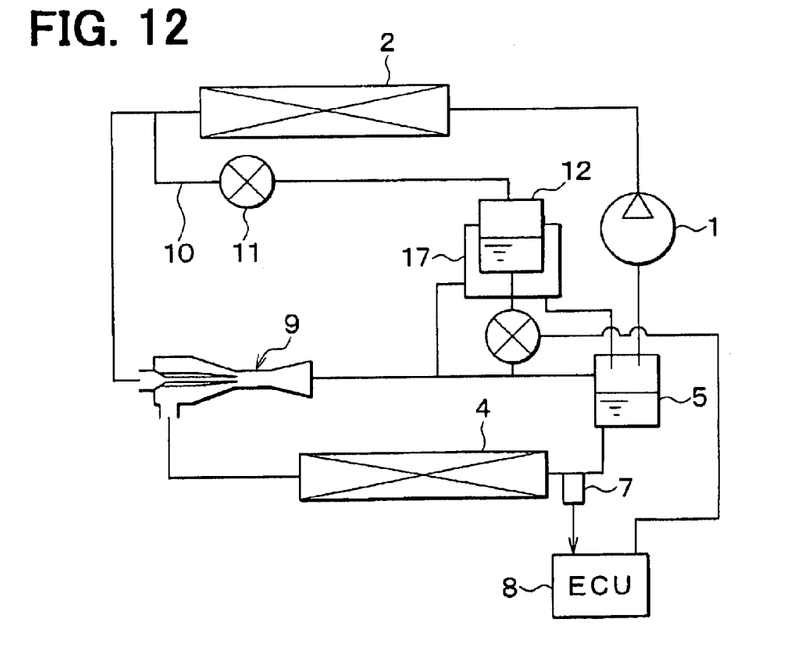
FIG. 12 is a schematic diagram of a vapor compression refrigerant cycle according to the ninth embodiment of the present invention.

In the ninth embodiment, the eighth embodiment is applied to the ejector cycle of the fifth embodiment shown in FIG. 8. Specifically, as shown in FIG. 12, the cooling device 17 is provided so that the refrigerant tank 12 is cooled by the low-pressure refrigerant the temperature of which is reduced by being decompressed in the ejector 9.

The temperature inside of the gas-liquid separator 5 is maintained at equal to or lower than the critical temperature. Therefore, the pressure of the low-pressure side refrigerant is maintained below the critical pressure.

[Tenth Embodiment]

Figure 13:
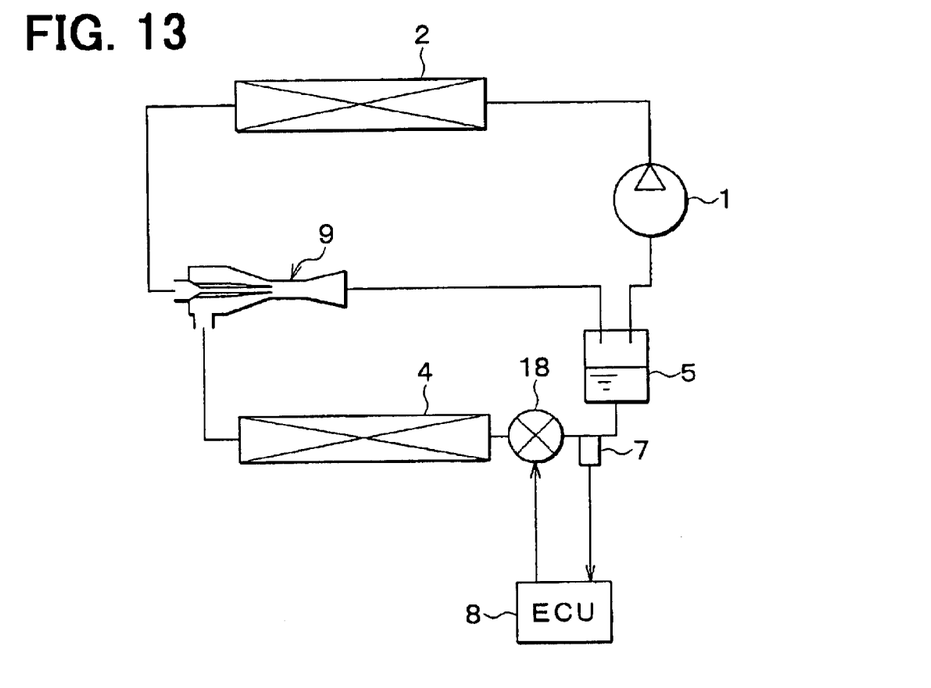
FIG. 13 is a schematic diagram of a vapor compression refrigerant cycle according to the tenth embodiment of the present invention.

As shown in FIG. 13, a flow rate adjusting valve 18 for adjusting the flow rate of the refrigerant flowing into the evaporator 4 is provided in the ejector cycle. When the temperature of the refrigerant detected by the sensor 7 exceeds the saturation temperature corresponding to the predetermined pressure (for example, 6 MPa) that is equal to or lower than the critical pressure, an opening degree of the flow rate adjusting valve 18 is reduced. Thus, the flow rate of the refrigerant flowing into the evaporator 4 is reduced smaller than that before the refrigerant pressure in the evaporator 4 exceeds the predetermined pressure. In this way, the pressure of the low-pressure side refrigerant can be maintained below the critical pressure of the refrigerant.

Although the flow rate adjusting valve 18 is arranged in a refrigerant passage connecting the gas-liquid separator 5 and the evaporator 4 in FIG. 13, the position of the flow rate adjusting valve 18 is not limited. For example, the flow rate adjusting valve 18 can be arranged in a refrigerant passage connecting the ejector 9 and the evaporator 4.

[Eleventh Embodiment]

Figure 14:
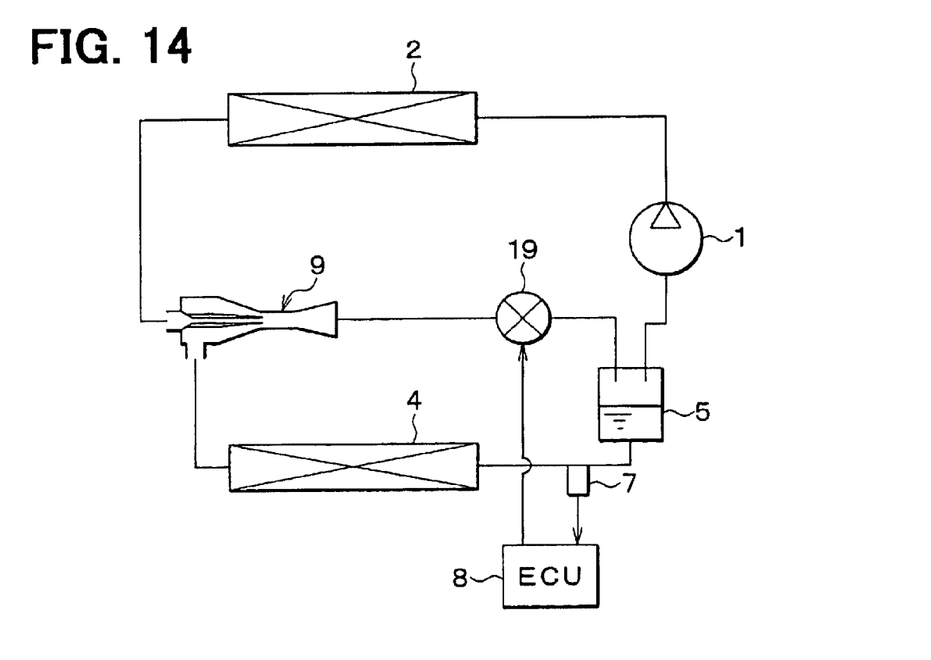
FIG. 14 is a schematic diagram of a vapor compression refrigerant cycle according to the eleventh embodiment of the present invention.

In the eleventh embodiment, an open and close valve 19 for opening and closing a refrigerant passage connecting the ejector 9 and the gas-liquid separator 5 is provided in the ejector cycle, as shown in FIG. 14. When the temperature detected by the sensor 7 exceeds the saturation temperature corresponding to the predetermined pressure (for example, 6 MPa) that is equal to or lower than the critical pressure, the open and close valve 19 is closed.

When the open and close valve 19 is closed, the refrigerant circulates in the ejector cycle through the compressor 1, the radiator 2, the nozzle of the ejector 9, the evaporator 4, the gas-liquid separator 5 and the compressor 1 in this order. At this time, the ejector 9 simply works as a decompressing means without having pressure increasing function.

In this cycle, the refrigerant having low temperature is directly introduced to the evaporator 4 right after decompressed by the ejector 9. Therefore, the temperature of the refrigerant supplied to the evaporator 4 is not increased. Accordingly, a large drop in the cooling capacity (heat absorbing capacity) of the evaporator 4 is restricted.

[Twelfth Embodiment]

Figure 15:
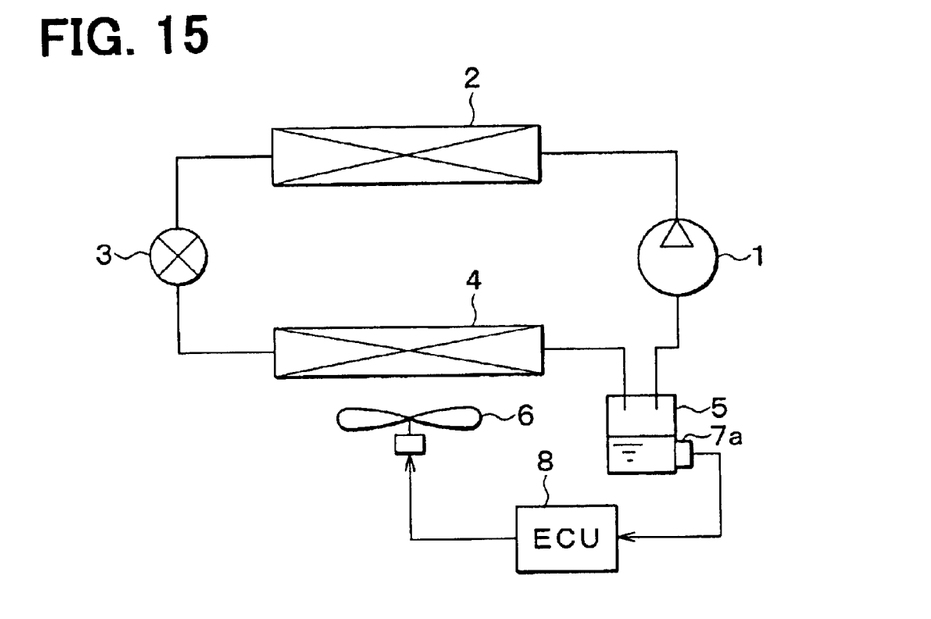
FIG. 15 is a schematic diagram of a vapor compression refrigerant cycle according to the twelfth embodiment of the present invention.

In the above embodiments, the pressure of the low-pressure side refrigerant is detected indirectly by detecting the refrigerant temperature with the temperature sensor 7. In the twelfth embodiment, however, the pressure of the low-pressure side refrigerant is directly detected by a pressure sensor 7a, as shown in FIG. 15. Here, the arrangement position of the sensor 7a is not limited in the gas-liquid separator 5.

[Thirteen Embodiment]

Figure 16:
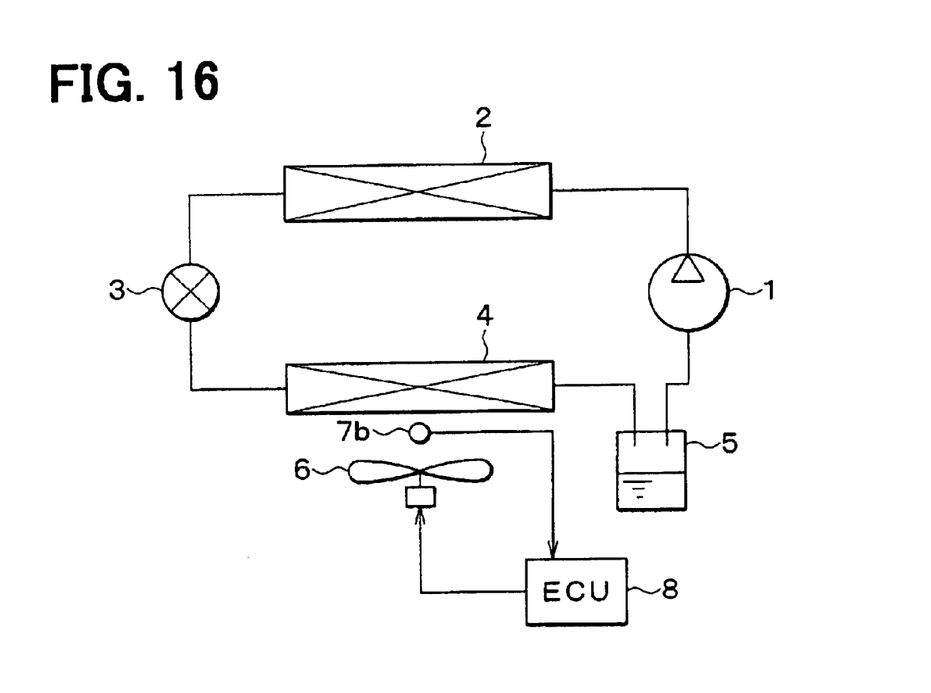
FIG. 16 is a schematic diagram of a vapor compression refrigerant cycle according to the thirteenth embodiment of the present invention.

In the thirteenth embodiment, an air temperature sensor 7b is provided at an air upstream side of the evaporator 4, as shown in FIG. 16. The sensor 7b detects the temperature of the air to be flowed into the evaporator 4. A maximum heat absorbing rate in the evaporator 4 is calculated based on the air blow rate and the temperature of the air to the evaporator 4. The air blow rate is controlled such that the maximum heat absorbing rate is equal to or less than a predetermined level. In this way, the pressure of the low-pressure side refrigerant is maintained below the critical pressure.

The maximum heat absorbing rate can be calculated based on the temperature detected by such as an air temperature sensor provided on an air downstream side of the evaporator 4, in place of the temperature detected by the sensor 7b provided on the air upstream side of the evaporator 4. Further, the temperature detected by an inside air temperature sensor and the temperature detected by an outside air temperature sensor can be used during an inside air mode and the outside air mode, respectively.

[Fourteenth Embodiment]

Figure 17:
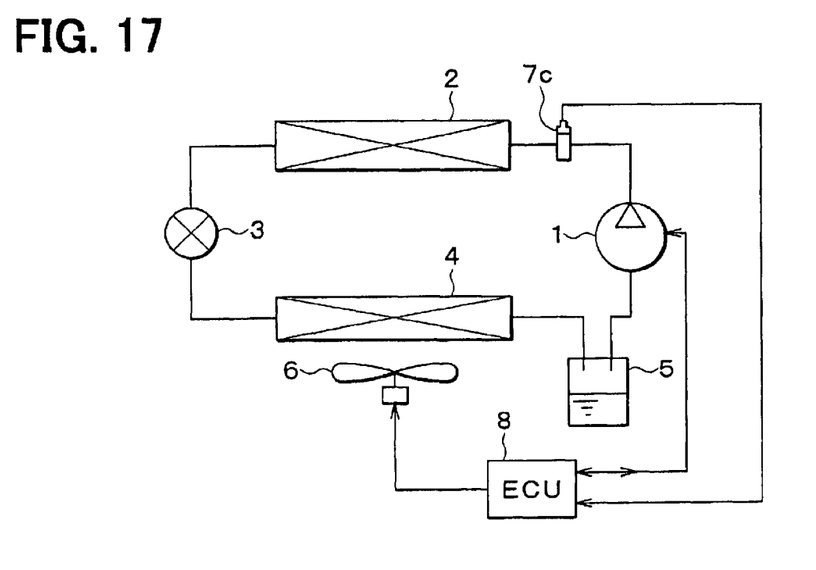
FIG. 17 is a schematic diagram of a vapor compression refrigerant cycle according to the fourteenth embodiment of the present invention.

In the fourteenth embodiment, a pressure sensor 7c is provided on the high-pressure side in the cycle, as shown in FIG. 17. The pressure sensor 7c detects pressure of the high-pressure side refrigerant.

The pressure of the low-pressure side refrigerant is estimated based on the pressure detected by the pressure sensor 7c, rotation speed of the compressor 1 and power consumption of the compressor 1.

[Fifteenth Embodiment]

In the fifteenth embodiment, as the predetermined pressure that is equal to or lower than the critical pressure, the pressure that the product of latent heat of vaporization of the refrigerant and density of the gas refrigerant is on a maximum level is used.

Figure 18:
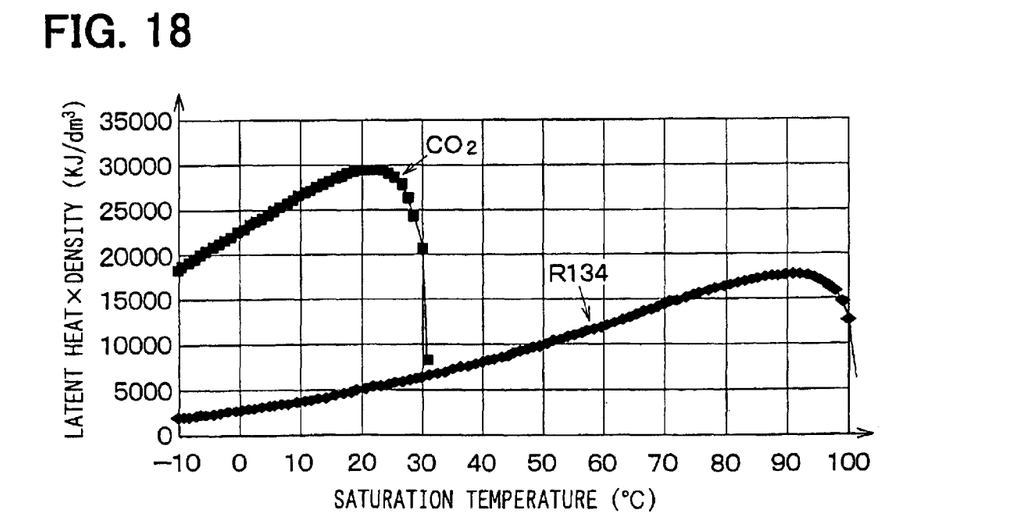
FIG. 18 is a graph showing a relationship between the product of latent heat of vaporization of refrigerant and density of gas refrigerant and a saturation temperature of the refrigerant.

FIG. 18 shows a relationship between the product of the latent heat of the vaporization of the refrigerant and density of the gas refrigerant and the saturation temperature of the refrigerant. As shown in FIG. 18, the product is on the maximum level just before the saturation temperature. Therefore, by using the pressure that the product is in the maximum level as the predetermined pressure, a large drop in the cooling capacity is restricted.

Although the present invention is used for the vehicular air conditioning unit in the above-described embodiments, the present invention is not limited to this.

The refrigerant is not limited to carbon dioxide. Other refrigerant can be used as long as it has the critical temperature equal to or less than sixty degrees Celsius.

The present invention should not be limited to the disclosed embodiments, but may be implemented in other ways without departing from the spirit of the invention.

What is claimed is:

1. A vapor compression refrigerant cycle for transferring heat from low-temperature refrigerant to high-temperature refrigerant, the cycle comprising:

a compressor for compressing refrigerant;

a first heat exchanger for cooling high-pressure refrigerant compressed in the compressor; and a second heat exchanger for vaporizing low-pressure refrigerant after being decompressed, wherein the refrigerant has a critical temperature equal to or lower than sixty degrees Celsius, wherein a pressure of the refrigerant in the second heat exchanger is controlled equal to or lower than a critical pressure of the refrigerant.

2. The vapor compression refrigerant cycle according to claim 1, further comprising:

a controlling device for controlling a pressure of the low-temperature refrigerant so that the pressure of the refrigerant in the second heat exchanger is equal to or lower than the critical pressure.

3. The vapor compression refrigerant cycle according to claim 1, wherein the pressure of the refrigerant in the second heat exchanger is controlled by controlling a flow rate of air passing through the second heat exchanger.

4. The vapor compression refrigerant cycle according to claim 3, wherein, when the pressure of the refrigerant in the second heat exchanger is higher than the critical pressure, the flow rate of the air is controlled equal to or less than a predetermined rate.

5. The vapor compression refrigerant cycle according to claim 1, wherein the pressure of the refrigerant in the second heat exchanger is controlled by controlling a flow rate of the refrigerant flowing to the second heat exchanger.

6. The vapor compression refrigerant cycle according to claim 5, wherein, when the pressure of the refrigerant in the second heat exchanger exceeds the critical pressure, the flow rate of the refrigerant is controlled lower than that before the pressure exceeds the predetermined pressure.

7. The vapor compression refrigerant cycle according to claim 1, further comprising:

a decompressing device that decompresses the high-temperature refrigerant discharged from the first heat exchanger.

8. The vapor compression refrigerant cycle according to claim 7, wherein the decompressing device includes an ejector that includes a nozzle for decompressing the refrigerant discharged from the first heat exchanger and a pressure increasing portion for increasing pressure of the refrigerant by converting velocity energy to pressure energy while sucking refrigerant from the second heat exchanger.

9. The vapor compression refrigerant cycle according to claim 2, wherein the controlling device includes an electronic control unit.

10. The vapor compression refrigerant cycle according to claim 2, wherein the controlling device includes a valve disposed to control a flow rate of the refrigerant in the second heat exchanger.

11. The vapor compression refrigerant cycle according to claim 1, wherein the refrigerant includes carbon dioxide.

12. A vapor compression refrigerant cycle for transferring heat from low-temperature refrigerant to high-temperature refrigerant, the cycle comprising:

a compressor for compressing refrigerant;

a first heat exchanger for cooling high-pressure refrigerant compressed in the compressor; and a second heat exchanger for vaporizing low-pressure refrigerant after being decompressed, wherein the refrigerant has a critical temperature equal to or lower than sixty degrees Celsius, a pressure of the refrigerant in the second heat exchanger is controlled equal to or lower than a predetermined pressure; and the pressure of the refrigerant in the second heat exchanger is controlled equal to or lower than a pressure that a product of latent heat of vaporization of the refrigerant and density of gas refrigerant is on a maximum level.

13. A vapor compression refrigerant cycle comprising:

a compressor compressing refrigerant;

a radiator for cooling high-temperature and high-pressure refrigerant compressed in the compressor;

a low-pressure side heat exchanger for vaporizing low-pressure and low-temperature refrigerant;

an ejector including a nozzle for decompressing and expanding the refrigerant discharged from the radiator by converting pressure energy of the refrigerant to velocity energy, and a pressure increasing portion for increasing pressure of the refrigerant by converting the velocity energy to the pressure energy while mixing the refrigerant jetted from the nozzle and the refrigerant sucked from the low-pressure side heat exchanger;

a gas-liquid separator for separating the refrigerant discharged from the ejector into gas refrigerant and liquid refrigerant, supplying the gas refrigerant to an inlet of the compressor and supplying the liquid refrigerant to the low-pressure side heat exchanger; and a valve provided on a refrigerant passage connecting the ejector and the gas-liquid separator, wherein the valve is closed when a pressure of the refrigerant in the low-pressure side heat exchanger is higher than a predetermined pressure that is equal to or lower than a critical pressure.

14. The vapor compression refrigerant cycle according to claim 13, wherein the refrigerant has a critical temperature equal to or lower than sixty degrees Celsius.

* * * * *